(12) United States Patent
Liburd et al.

(10) Patent No.: US 10,769,005 B2
(45) Date of Patent: Sep. 8, 2020

(54) COMMUNICATION INTERFACE BETWEEN A FUSION ENGINE AND SUBSYSTEMS OF A TACTICAL INFORMATION SYSTEM

(71) Applicant: Goodrich Corporation, Charlotte, NC (US)

(72) Inventors: Allan B. Liburd, Worcester, MA (US); Matthew Goldstein, Nashua, NH (US); Emily Seto, Canton, MA (US)

(73) Assignee: Goodrich Corporation, Charlotte, NC (US)

( * ) Notice: Subject to any disclaimer, the term of this patent is extended or adjusted under 35 U.S.C. 154(b) by 21 days.

(21) Appl. No.: 16/213,687

(22) Filed: Dec. 7, 2018

(65) Prior Publication Data
US 2020/0183767 A1    Jun. 11, 2020

(51) Int. Cl.
*G06F 9/54*      (2006.01)
*G06K 9/62*      (2006.01)

(52) U.S. Cl.
CPC .......... *G06F 9/546* (2013.01); *G06K 9/6288* (2013.01)

(58) Field of Classification Search
CPC ............. G06K 9/6288; G06K 2209/21; G06T 2207/30212; G06T 2207/20221
See application file for complete search history.

(56) References Cited

U.S. PATENT DOCUMENTS 8,336,775 B2   12/2012   Wood et al.
9,734,455 B2   8/2017    Levinson et al.
10,068,177 B2  9/2018    Hershey et al.
2006/0082490 A1* 4/2006  Chen .................... G06K 9/3241
                                                       342/52

(Continued)

FOREIGN PATENT DOCUMENTS

WO     WO-2012003039     1/2012

OTHER PUBLICATIONS

Castanedo et al., "Data Fusion to Improve Trajectory Tracking in a Cooperative Surveillance Mult-Agent Architecture" (2010), Information Fusion 11, pp. 243-255 [retrieved from https://www.sciencedirect.com/science/article/pii/S1566253509000815].*

(Continued)

*Primary Examiner* — Brian W Wathen
(74) *Attorney, Agent, or Firm* — Locke Lord LLP; Scott D. Wofsy; Judy R. Naamat

(57) ABSTRACT

A subsystem of a tactical information system is provided that includes a memory configured to store instructions and a processor disposed in communication with the memory. The processor, upon execution of the instructions is configured to receive first standardized entity messages that include target information from multiple automatic target recognition (ATR) systems, parse the first standardized entity messages to extract the target information, provide the extracted target information to a fusion algorithm for fusion processing that determines whether to fuse the target information from different ATR systems and fuses the extracted target information to generate fused target information about a single target when determined to do so, receive fused target information about the single target, if any, from the fusion algorithm, and generate a second standardized entity message that includes the fused target information about the single target.

18 Claims, 3 Drawing Sheets

(56) References Cited

U.S. PATENT DOCUMENTS

| | | | | |
|---|---|---|---|---|
| 2006/0271251 | A1* | 11/2006 | Hopkins | A63H 30/04 701/23 |
| 2008/0027887 | A1* | 1/2008 | Barbu | G06N 20/00 706/25 |
| 2009/0115654 | A1* | 5/2009 | Lo | F41G 7/008 342/62 |
| 2010/0157056 | A1* | 6/2010 | Zohar | G01S 3/7864 348/144 |
| 2010/0226534 | A1* | 9/2010 | Doria | G06K 9/3241 382/103 |
| 2013/0021475 | A1* | 1/2013 | Canant | H04N 5/33 348/144 |
| 2015/0347871 | A1* | 12/2015 | Sathyendra | G06K 9/6267 382/103 |
| 2016/0086466 | A1* | 3/2016 | Foster | G08B 13/2494 348/143 |
| 2017/0200305 | A1* | 7/2017 | Oddo | G06F 16/256 |
| 2018/0164820 | A1* | 6/2018 | Aboutalib | B64C 39/02 |
| 2018/0239991 | A1* | 8/2018 | Weller | G06F 16/907 |
| 2019/0079509 | A1* | 3/2019 | Bosworth | B64D 1/08 |

OTHER PUBLICATIONS

Tokar, J.L., "A Comparison of Avionics Open System Architectures" (Oct. 6-7, 2016), HILT '16, pp. 22-26 [retrieved from https://dl.acm.org/doi/abs/10.1145/3092893.3092897].*

Tomic et al., "Toward a Fully Autonomous UAV" (Sep. 2012), IEEE Robotics & Automation Magazine, pp. 46-56 [retrieved from https://ieeexplore.ieee.org/stamp/stamp.jsp?arnumber=6290694].*

Llinas et al., "An Introduction to Multi-Sensor Data Fusion" (Jun. 1998), Proceedings of the 1998 IEEE International Symposium on Circuits and Systems, pp. 537-540 [retrieved from https://ieeexplore.ieee.org/abstract/document/705329].*

"STANAG 4586 NAVY (Edition 2)—STandard Interfaces of UAV Control Systems (UCS) for NATO UAV Interoperability" (Nov. 2007), pp. 1-272 [retrieved from http://innuvativesystems.com/STANAG4586Eed02a2_PubliclyReleased.pdf].*

Extended European Search Report for European Patent Application No. EP19214580.3, dated Apr. 6, 2020.

Yong Deng et al: "Target Recognition Based on Fuzzy Dempster Data Fusion Method", Defence Science Journal, vol. 60, No. 5, Jul. 29, 2010 (Jul. 29, 2010), pp. 525-530, XP055679657, In ISSN: 0011-748X, DOI: 10.14429/dsj.60.576.

* cited by examiner

COMMUNICATION INTERFACE BETWEEN A FUSION ENGINE AND SUBSYSTEMS OF A TACTICAL INFORMATION SYSTEM

BACKGROUND OF THE INVENTION

1. Field of the Invention

The present disclosure relates to a fusion engine of a tactical information system (TIS), and more particularly, to a communication interface between the fusion engine and subsystems of the TIS.

2. Description of Related Art

Military forces are increasing usage of unmanned aerial systems (UAS). UASs have been playing increasing roles in tactical operations, such as intelligence, surveillance and reconnaissance (ISR), precision strikes, and special operations. The UAS Command and Control Initiative (UCI) was developed as a product of an industry-wide focus on providing interoperability between different systems, for example UASs, systems of different military departments, robotic systems, manually operated airborne platforms, and ground systems.

In a tactical information system (TIS), a fusion engine can determine whether or not to combine target information from multiple sources, such as automatic target recognition (ATR) systems. The fusion engine may rely on communication with many subsystems of the TIS, yet has unique communication needs for supporting its operations.

While conventional methods and systems have generally been considered satisfactory for their intended purpose, there is still a need in the art for a fusion engine of a TIS that can interact with other subsystems of the TIS to perform in coordination with the other subsystems.

SUMMARY OF THE DISCLOSURE

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a subsystem of a tactical information system (TIS). The subsystem includes a memory configured to store instructions and a processor disposed in communication with the memory.

The processor, upon execution of the instructions is configured to receive first standardized entity messages that include target information from multiple automatic target recognition (ATR) systems, parse the first standardized entity messages to extract the target information, provide the extracted target information to a fusion algorithm for fusion processing that determines whether to fuse the target information from different ATR systems and fuses the extracted target information to generate fused target information about a single target when determined to do so, receive fused target information about the single target, if any, from the fusion algorithm, and generate a second standardized entity message that includes the fused target information about the single target.

In embodiments, the tactical decisions include controlling a subsystem of the TIS to update intelligence information or maneuver the subsystem to perform an action.

In embodiments, the processor, upon execution of the instructions, is further configured to submit standardized fusion capability messages that include fusion capability information that describes at least one of technical capabilities for performing fusion of output from the ATR systems and status of the technical capabilities.

In embodiments, the processor, upon execution of the instructions, is further configured to receive a standardized query request about capability to fuse target information, wherein the standardized fusion capability messages are submitted in response to the standardized query request and/or periodically.

In embodiments, the processor, upon execution of the instructions, is further configured to receive a standardized product processing request that requests target fusion of different target information from one or more subsystems of the TIS, wherein receiving the first standardized entity messages is included with receiving the standardized product processing request, wherein the standardized product processing request includes identification of the standardized entity messages, or receiving the first standardized entity messages is in response to a request for the first standardized entity messages.

In embodiments, the processor, upon execution of the instructions, is further configured to receive from the fusion algorithm a non-standardized success indication that indicates success or failure of fusing the extracted target information by the fusion algorithm, and transmit a standardized product processing report externally that indicates the success or failure of the fusing.

In embodiments, the standardized messages are Unmanned Aircraft System (UAS) Command and Control (C2) Initiative (UCI) compliant messages.

In embodiments, the TIS further includes an internal interface by which the processor communicates with the fusion algorithm and an external interface by which the processor communicates with an external subsystem of the TIS using only standardized messages.

In embodiments, the internal interface includes an application programming interface.

In another aspect, a method is provided that includes receiving first standardized entity messages that include target information, wherein the target information originates from multiple automatic target recognition (ATR) systems and parsing the first standardized entity messages to extract the target information. The method further includes providing the extracted target information to a fusion algorithm for fusion processing that determines whether to fuse the target information from different ATR systems and fuses the extracted target information to generate fused target information about a single target when determined to do so, receiving fused target information about the single target, if any, from the fusion algorithm, and generating a second standardized entity message that includes the fused target information about the single target.

In accordance with still another aspect of the disclosure, a non-transitory computer readable storage medium having one or more computer programs stored therein associated with a subsystem of a tactical information system is provided. The computer programs associated with the subsystem comprising instructions, which when executed by a processor of a computer system, cause the processor to perform the operations of the method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
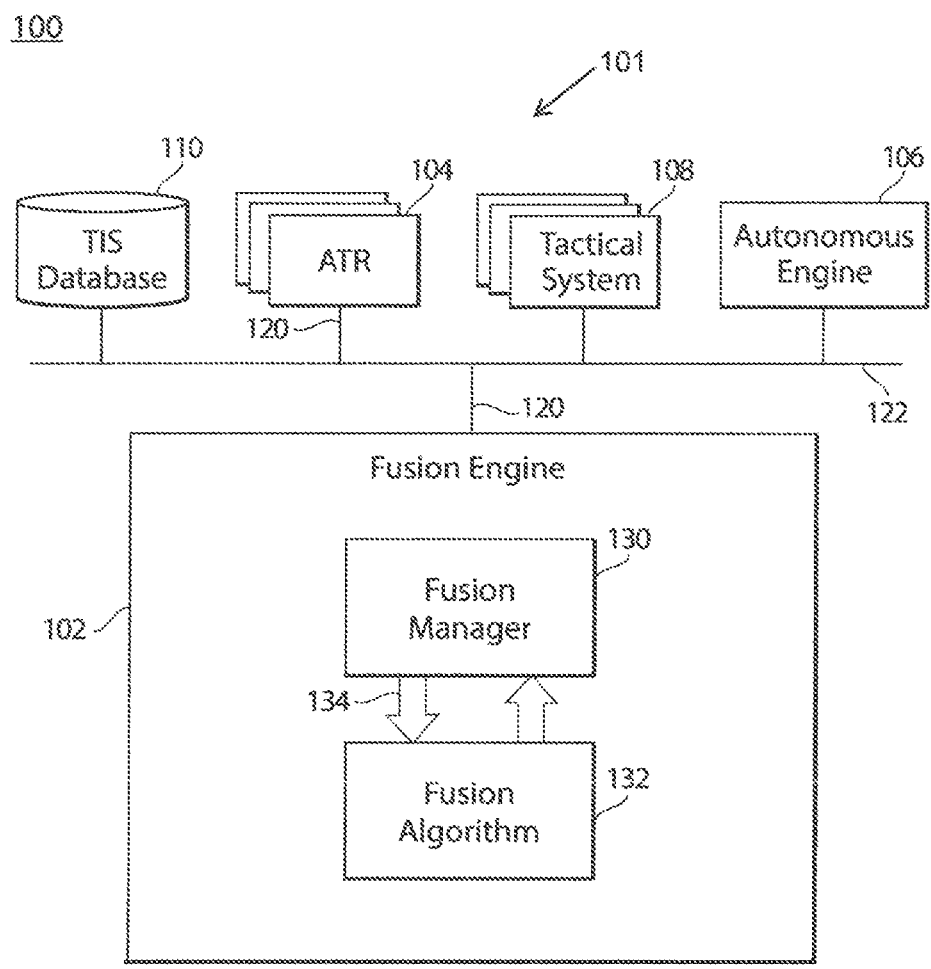
FIG. 1 is a block diagram of an exemplary embodiment of a tactical information system (TIS) in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a tactical information system in accordance with the disclosure is shown in FIG. 1 and is designated generally by reference character 100. Methods associated with operations of the tactical information system (TIS) 100 in accordance with the disclosure, or aspects thereof, are provided in FIGS. 2 and 3, as will be described. The systems and methods described herein can be used to provide improved interoperability between a fusion engine of the TIS 100 and other subsystems of the TIS 100.

TIS 100 includes many subsystems 101, including for example, a fusion engine 102, one or more automatic target recognition (ATR) systems 104, an autonomous engine 106, other tactical subsystems 108 (e.g., unmanned aerial systems (UASs), manually operated airborne platforms, ground control systems, space-based systems, etc.), and a TIS database 110. Tactical information can be shared among these subsystems 122.

Tactical information can be obtained, processed, shared, and generated by the tactical information system 100. Such tactical information can include, for example and without limitation, sensed data obtained by sensors on one or more UASs or manually operated airborne platforms, target recognition output, such as by automatic target recognition (ATR) systems, fused target data, and intelligence data that coordinates information from multiple ATR systems.

Subsystems 101 exchange tactical information with one another via communication links 120, such as by requesting data, transmitting data and publishing data. Due to recent initiatives, interoperability for the exchange of tactical information between many subsystems of a traditional TIS has been achieved using a standardized communication protocol, such as UAS Command and Control Initiative (UCI). However, these initiatives did not provide for interoperability between a fusion engine and other subsystems of the TIS using such a standardized protocol due to particular communication needs of fusion engines.

The present disclosure discloses methods for communication interoperability between subsystems 101 of TIS 100, including between the fusion engine 102 and other subsystems 101 of the TIS 100 using an enhanced standardized protocol for sending messages over communication links 120 (e.g., wired or wireless communication links). Additionally, the fusion engine 102 is configured to include a fusion manager 130 and a fusion algorithm 132, wherein the fusion manager 130 provides a communication interface for communicating via links 120 with the other subsystems 101 of the TIS 100 using the enhanced standardized protocol (referred to hereon in as a standardized protocol) and for communicating via internal communication interface 134 with the fusion algorithm 132 without the restrictions of the standardized protocol. In embodiments, the modified standardized protocol is an enhanced version of UCI. The internal communication interface 134 can include an application programming interface (API) using a target class that is shared and updated by the fusion manager 130 and fusion algorithm 132.

During a fusion procedure, the fusion algorithm 132 receives extracted mixed target information via internal communication interface 134 from the fusion manager 130. The term "receive" can be broadly construed in the context of obtaining information through the internal communication interface 134 to mean access, receive by transmission, read, or otherwise obtain. The mixed target information was received by the fusion manager 130 using the standardized protocol. The mixed target information originated from multiple sources, each of the sources providing target information about a recognized target. The multiple sources can be ATR systems 104. The respective ATR systems 104 provide information about a target that was recognized, wherein the combination of target information from the different ATR systems 104 constitutes mixed target information. Information, including target information, from the ATR systems 104 and tactical subsystems 108 can be stored in TIS database 110 and accessed by other components of the TIS 100. The fusion manager 130 can access TIS database 110 and other components of the TIS 100 as appropriate, such as via links 120 and/or a bus 122. Communication between the components of the TIS 100 uses a standard protocol, such as unmanned aerial systems Command and Control Initiative (UCI).

UCI in its current form does not support certain message sequences that can be used by the fusion algorithm 132 to exchange information as needed. Accordingly, fusion manager 130 and internal communication interface 134 and increased capabilities of the standard protocol as disclosed herein provide a way for the fusion algorithm 132 to exchange information as needed with the components of the TIS 100 via the fusion manager 130, wherein communication between the fusion manager 130 and components of the TIS is compliant with the standard protocol.

The target information about respective candidate targets included in the extracted mixed target information provided to the fusion algorithm 132 includes first objects available to be fused into fused target information about a single target. The fusion algorithm 132 applies an algorithm to determine whether the extracted mixed target information meet certain criteria. If the criteria are met, the target information for one or more of the candidate targets included in the extracted mixed target information is fused into raw fused target information about a single fused target. After the fusion is performed, the fusion algorithm 132 outputs an internal indication to the fusion manager 130 via internal communication interface 134 that the fusion was completed and outputs the raw fused target information. If the criteria are not met and a fusion is not performed, the fusion algorithm 132, in embodiments, outputs an internal indication to the fusion manager 130 via internal communication interface 134 that the fusion was not completed.

The fusion manager 130 forms standardized messages that include the fused target information and provides the fused target information in the standardized messages via one or more links 120 to at least one of the subsystems 101. In embodiments, the fusion manager 130 broadcasts the standardized messages with the fused target information so that they are available to any of the subsystems 101 listening to communications on links 120.

Figure 2:
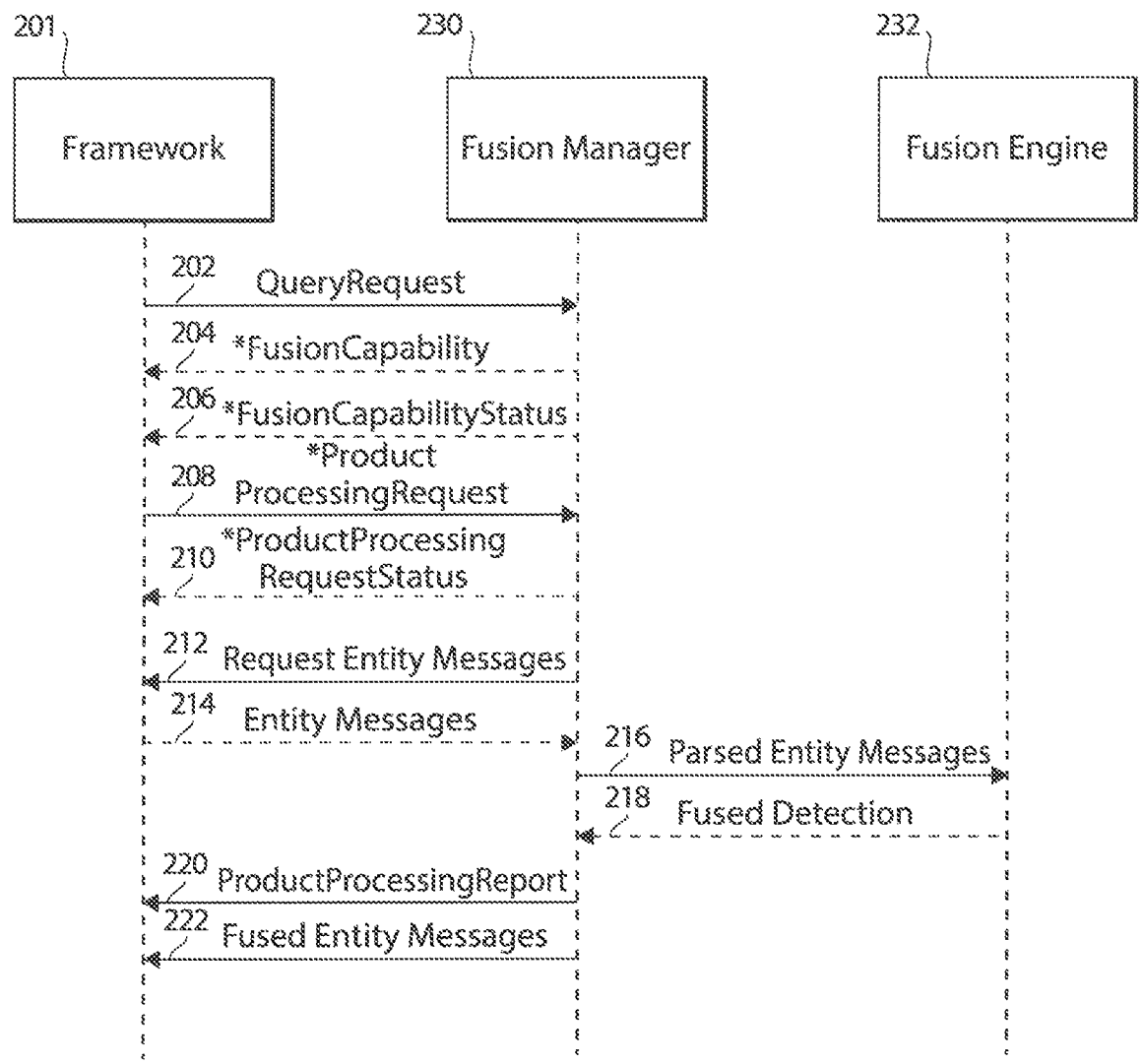
FIG. 2 is a flow diagram of communication exchanged with a fusion manager of a fusion engine of a TIS, in accordance with embodiments of the disclosure.

FIG. 2 shows a flow diagram of an example data flow between the fusion manager 130 and each of a framework 201 and the fusion engine 132. The framework 201 is a processing system of one of the other subsystems 101 of the TIS 100. All communication that is between the fusion manager 130 and the framework 201 is via links 120 and/or bus 122 using the standardized protocol. Communication between the fusion manager 130 and the fusion algorithm 132 is via internal communication interface 134, which is not restricted to the standardized protocol. The arrows indicate transmissions. Those arrows showed with dashed lines indicate a "RETURN" state in which information is being returned in response to a request.

A fusion procedure can be initiated by a FusionCapability message sent at transmission 204 from the fusion manager 130 to the framework 201. The FusionCapability message indicates capability of the fusion engine 102 for performing fusion procedures. The FusionCapability message advertises the most static characteristics of a mission-ready "fusion capability", which can vary from mission to mission. This message denotes whether or not the fusion engine 102 is capable of completing a task if it is invoked. The fusion manager 130 can continue to transmit FusionCapability messages at configurable intervals to indicate that the service is alive. In the context of UCI, the FusionCapability message does not currently exist in the UCI standard.

Once the framework 201 understands the fusion engine service is alive, a QueryRequest message is sent at transmission 202 from the framework 201 to the fusion manager 130. The QueryRequest is meant to query whether the fusion engine 102 has the capability to accept the task of performing a fusion procedure. The QueryRequest can identify which resources are needed to perform the task. In the context of UCI, the QueryRequest message is a standardized message that represents a query for a new message and/or a filtered set of messages, with the ability to support service-level and application-level queries for messages.

The fusion manager 130 ingests the QueryRequest message by responding to the QueryRequest message with a QueryRequestStatus at transmission 206.

The QueryRequestStatus indicates the results of an ingested QueryRequest message. The QueryRequestStatus is the acknowledgment that the fusion manager 130 has received a QueryRequest message from the framework 201. Encapsulated in a QueryRequest message is a FusionCapabilityStatus message. The FusionCapabilityStatus indicates status (e.g., availability) of the fusion engine 102 for performing fusion procedures. Other examples of status include capability, random access memory (RAM) required to execute a capability, central processing unit (CPU) cores required to process a capability, and next available window for processing.

The FusionCapabilityStatus indicates results of the FusionCapability message, providing minimum requirements the fusion engine 102 can provide to execute the capability indicated in the FusionCapability message. FusionCapabilityStatus messages can be alongside the FusionCapability messages at the configurable intervals or in response to a condition, such as in response to a QueryRequest message from the framework 201. In the context of UCI, the FusionCapabilityStatus message does not currently exist in the UCI standard.

In embodiments, upon receipt of the QueryRequest, the fusion manager 130 can determine whether or not the fusion engine 102 is configured to accept such a task and transmit FusionCapabilityStatus messages encapsulated in QueryRequestStatus messages to denote its acceptance or rejection of the task. In embodiments, the framework 201 can determine based on information provided in the FusionCapabilityStatus whether or not to proceed or whether to attempt to use a different fusion manager 130 to perform the task. When the fusion manager 130 determines that its capability and status as indicated by its FusionCapability and FusionCapabilityStatus messages is compatible with the upcoming task, it expects transmission of a ProductProcessingRequest message.

At transmission 208, fusion manager 130 receives a ProductProcessingRequest message from the framework 201. The ProductProcessingRequest message requests performance of a fusion process, which can invoke processing of a resource, namely identified Entity messages, by the fusion manager 130.

This ProductProcessingRequest message can be generated by an operator of framework 201, e.g., to command immediate processing of target information, or automatically by the framework 201 without human intervention, e.g., as a result of executing a task. The ProductProcessingRequest message can include two or more identifiers of Entity messages that include the target information requested to be fused. If those Entity messages are not readily available to the fusion manager 130 or are not identified, the fusion manager ingests the ProductProcessingRequest message by requesting these Entity messages by way of querying for Entity messages from a database (e.g., TIS database 110) in the framework 201 at transmission 212 (wherein the query is a function called in an application programming interface of a database).

In the context of UCI, the framework 201 can transmit the ProductProcessingRequest message based on a ProcessExecute message and populated using a default plan (e.g., ProductProcessingPlan) to determine processing type and parameters or using user-defined processing type and parameters. If a ProductProcessingRequest is automatically generated as a result of a ProcessExecute message, then the processing requirements would be required with those specified in the ProcessExecute. The default plan can be used or overridden on a task-by-task basis.

The framework 201 can respond to the query for Entity messages (which is a functional call to a database application programming interface, such as an API for accessing the TIS database 110) with the requested Entity messages at transmission 214. These Entity messages can include an acknowledgement to acknowledge receipt of the database query transmitted from the fusion manager 130. Entity messages are received by the fusion manager 130 at transmission 214 in response to the database query, or are accessed based on identification of the Entity messages in the ProductProcessingRequest message. The Entity messages provide mixed target information upon which to perform the fusion process. The mixed target information can be included in one or more Entity messages.

The fusion manager 130 further processes the ProductProcessingRequest and Entity messages by parsing the Entity messages to extract target information, and provide the extracted target information to the fusion algorithm 132 at transmission 216 via internal communication interface 134. Transmission 216 can include storing the extracted target information as first objects in the internal communication interface 134. The fusion manager 130 determines which information to parse from the Entity messages and pass to the fusion algorithm 132 as extracted data. Examples of information to be parsed include: location (e.g., in terms of latitude and longitude), geopositioning uncertainties, identification of source file, target type confidence, target type, sensor type, and date and time of a given directive. An object of field for each parsed item is available in the internal communication interface 134 as extracted target information. The fusion algorithm 132 can access the extracted target information and perform a fusing process to decide whether or not to fuse and to fuse the extracted target information, if determined to do so.

The fusion algorithm 132 provides the fused information to the internal communication interface 134 by which the fusion manager 130 can receive it at transmission 218 via internal communication 134. Transmission 218 can include storing the fused target information as second objects in the internal communication interface. The fusion manager 130 receives the fused target information and/or an indication of completion or lack of completion of the fusion process from the fusion algorithm 132 via transmission 218 via internal communication interface 134.

The fusion manager 132 composes fused Entity messages using the fused target information and transmits the fused Entity messages at transmission 222 to the framework 201.

Transmission of the fused Entity messages at transmission 222 can include a broadcast via links 120 to other subsystems 101 of the TIS 100.

In addition, the fusion manager 132 can send one or more ProductProcessingRequestStatus messages at transmission 210. The ProductProcessingRequestStatus message indicates a current state of processing within the fusion engine 102. In the UCI context, the ProductProcessingRequestStatus provides a status update for a previously ingested ProductProcessingRequest.

The fusion manager 130 can further responds to receipt of the ProductProcessingRequest message with one or more ProductProcessingReport messages at transmission 220, and can indicate completion, or not, of the requested fusion process, as well as provide identifiers for the Entity messages that were fused. In the UCI context, a ProductProcessingReport message has two primary uses: (1) reporting (via publishing or broadcasting) the state of product processing and (2) persistence of state to support initialization and recovery of a service that is performing product processing.

The fusion manager 130 can send any of the ProductProcessingRequestStatus, FusionCapability, and FusionCapabilityStatus messages via links 120 using the standard protocol at configurable intervals or in response to a condition.

A subsystem 101 that receives the Entity messages from the fusion engine 102 can use the fused target information included in the Entity messages sent to make tactical decisions. Tactical decisions can include controlling the subsystem 101 or controlling a different subsystem 101 of the TIS 100, such as to update intelligence information with regard to the target identified in the fused target information or to maneuver the subsystem 101 to perform an action, such as surveillance, reconnaissance, a precision strike, or a special operation.

Table 1 below shows example objects that can be included in the class structure of the target class used by the API of the internal communication interface 134. Each object can be shared and/or updated by the fusion manager 130 and fusion algorithm 132.

TABLE 1

| Variable | Data Type | Description |
|---|---|---|
| Moving | bool | Determines whether a target is moving or non-moving. |
| Mobility | string | Determines whether a Target is a MOVER, NON_MOVER, or UNDETERMINED. An UNDETERMINED state will result in a non-moving type Target. |
| DateTime | int64_t | Defines the date and time the original Entity message was created. |
| Latitude | double | Defines the latitude of the Target. |
| Longitude | double | Defines the longitude of the Target. |
| Altitude | double | Defines the altitude of the Target. |
| Apriori | double | Defines the a priori information of the Target. |
| Confidence | double | Defines the confidence that a Target exists at a given location. |
| Fused | bool | Determines if this Target is the result of fusion or not. |
| SensorType | string | Defines the sensor platform the Target was captured on. |
| UUID | string | Defines the unique identifier of the Target. |
| Collection | string | Defines which collection this Target is a part of. |
| Label | string | Defines what object type this Target is (e.g. tank, submarine, etc.) |
| SystemName | string | Defines the name of the system the Target was originally captured on. |
| PositionCovariance | matrix | Defines the covariance matrix passed in from an Automatic Target Recognition (ATR) software. |
| Uncertainty | struct | Consists of semi-minor axis, semi-major axis, and orientation information. |

The fusion manager 130 determines what target information will be parsed from the Entity messages and passed into the fusion algorithm 132. The target information to be parsed may include, for example: location (in terms of latitude and longitude), geopositioning uncertainties, source file, confidence, target type, sensor type, and the date and time of a given directive. All of this target information stored in the internal communication interface 134 between the fusion manager 130 and the fusion algorithm 132.

Aspects of the present disclosure are described above with reference to flow diagram illustrations and/or block diagrams of methods, apparatus (systems) and computer program products according to embodiments of the disclosure. It will be understood that each block or exchange of data by transmission of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Embodiments of the TIS system 100 may be implemented or executed by one or more computer systems. For example, fusion manager 130, fusion algorithm 132, or framework 201 can be implemented using one or more computer systems such as example computer system 300 illustrated in FIG. 3. Each computer system 300 can implement one or more of fusion manager 130, fusion algorithm 132, or framework 201. In various embodiments, computer system 300 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 300 is only one example of a suitable system and is not intended to suggest any limitation as to the scope of use or functionality of embodiments of the disclosure described herein. Regardless, computer system 300 is capable of being implemented and/or performing any of the functionality set forth hereinabove.

Computer system 300 may be described in the general context of computer system-executable instructions, such as program modules, being executed by a computer system. Generally, program modules may include routines, programs, objects, components, logic, data structures, and so on that perform particular tasks or implement particular abstract data types. Computer system 300 may be practiced in distributed data processing environments where tasks are performed by remote processing devices that are linked through a communications network. In a distributed data processing environment, program modules may be located in both local and remote computer system storage media including memory storage devices.

Figure 3:
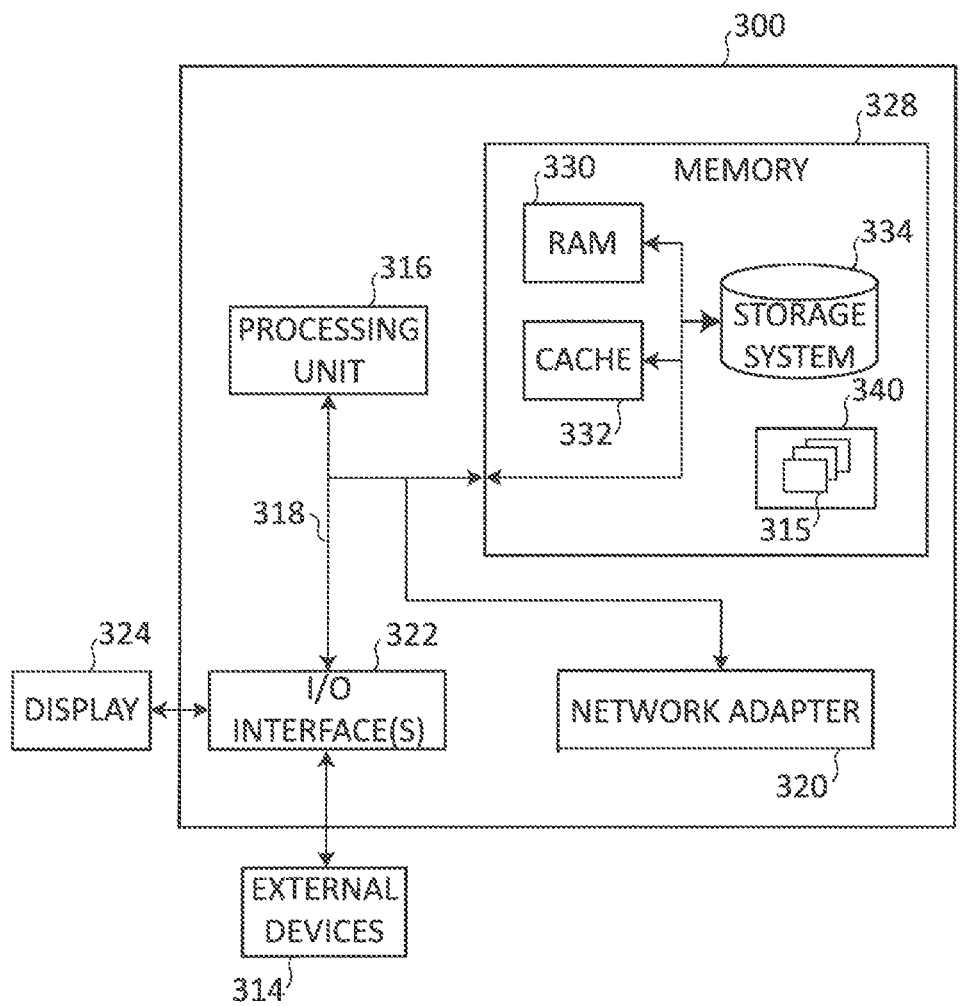
FIG. 3 is a block diagram of an exemplary computer system configured to implement the fusion manager in accordance with embodiments of the disclosure.

Computer system 300 is shown in FIG. 3 in the form of a general-purpose computing device. The components of computer system 300 may include, but are not limited to, one or more processors or processing units 316, a system memory 328, and a bus 318 that couples various system components including system memory 328 to processor 316. Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 300 typically includes a variety of computer system readable media. Such media may be any available media that is accessible by the TIS 100, and it includes both volatile and non-volatile media, removable and non-removable media.

System memory 328 can include computer system readable media in the form of volatile memory, such as RAM 330 and/or cache memory 332. Computer system 300 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 315, such as for performing the operations of the flow diagram shown in FIG. 2, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 315 generally carry out the functions and/or methodologies of embodiments of the disclosure as described herein.

Computer system 300 may also communicate with one or more external devices 314, such as another subsystem 101 of the TIS 100, a pointing device, a display 324, etc.; one or more devices that enable a user to interact with computer system 300; and/or any devices (e.g., network card, modem, etc.) that enable the TIS 100 to communicate with one or more other computing devices. Such communication can occur via Input/Output (I/O) interfaces 322. Still yet, computer system 300 can communicate with one or more networks such as, another subsystem 101 of the TIS 100, a local area network (LAN), a general wide area network (WAN), and/or a public network (e.g., the Internet) via network adapter 320. As depicted, network adapter 320 communicates with the other components of the TIS 100 via bus 318. It should be understood that although not shown, other hardware and/or software components could be used in conjunction with computer system 300. Examples, include, but are not limited to: microcode, device drivers, redundant processing units, external disk drive arrays, RAID systems, tape drives, and data archival storage systems, etc.

The flow diagram and block diagrams in the Figures illustrate the architecture, functionality, and operation of possible implementations of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method include the ability of a fusion engine of a TIS to communicate with other subsystems of the TIS using standardized protocols to handle unique capabilities encountered by the fusion engine.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A subsystem of a tactical information system (TIS), the system comprising:
    a memory configured to store instructions;
    a processor disposed in communication with the memory, wherein:
    the processor, upon execution of the instructions is configured to:
        receive first standardized entity messages that include target information from multiple automatic target recognition (ATR) systems;
        parse the first standardized entity messages to extract the target information;
        provide the extracted target information to a fusion algorithm for fusion processing that determines whether to fuse the target information from different ATR systems and fuses the extracted target information to generate fused target information about a single target when determined to do so;
        receive fused target information about the single target, if any, from the fusion algorithm; and
        generate a second standardized entity message that includes the fused target information about the single target,
    wherein the processor, upon execution of the instructions is further configured to:
        receive from the fusion algorithm a non-standardized success indication that indicates success or failure of fusing the extracted target information by the fusion algorithm; and
        transmit a standardized product processing report externally that indicates the success or failure of the fusing.

2. The tactical information system of claim 1, wherein the processor, upon execution of the instructions is further configured to transmit the second standardized entity message to a processing device of the TIS for execution of tactical decisions based on the fused target information included in the second standardized entity message.

3. The tactical information system of claim 2, wherein tactical decisions include controlling a subsystem of the TIS to update intelligence information or maneuver the subsystem to perform an action.

4. The tactical information system of claim 1, wherein the processor, upon execution of the instructions is further configured to submit standardized fusion capability messages that include fusion capability information that describes at least one of technical capabilities for performing fusion of output from the ATR systems and status of the technical capabilities.

5. The tactical information system of claim 4, wherein the processor, upon execution of the instructions is further configured to receive a standardized query request about capability to fuse target information, wherein the standardized fusion capability messages are submitted in response to the standardized query request and/or periodically.

6. The tactical information system of claim 4, wherein the processor, upon execution of the instructions is further configured to receive a standardized product processing request that requests target fusion of different target information from one or more subsystems of the TIS, wherein receiving the first standardized entity messages is included with receiving the standardized product processing request, or receiving the first standardized entity messages is in response to a request for the first standardized entity messages.

7. The tactical information system of claim 1, wherein the standardized messages are Unmanned Aircraft System (UAS) messages.

8. The tactical information system of claim 1, further comprising:
an internal interface by which the processor communicates with the fusion algorithm; and
an external interface by which the processor communicates with an external subsystem of the TIS using only standardized messages.

9. The tactical information system of claim 8, wherein the internal interface includes an application programming interface.

10. A method comprising:
receiving first standardized entity messages that include target information, wherein the target information originates from multiple automatic target recognition (ATR) systems;
parsing the first standardized entity messages to extract the target information;
providing the extracted target information to a fusion algorithm for fusion processing that determines whether to fuse the target information from different ATR systems and fuses the extracted target information to generate fused target information about a single target when determined to do so;
receiving fused target information about the single target, if any, from the fusion algorithm;
generating a second standardized entity message that includes the fused target information about the single target;
receiving from the fusion algorithm a non-standardized success indication that indicates success or failure of fusing the extracted target information by the fusion algorithm; and
transmitting a standardized product processing report externally that indicates the success or failure of the fusing.

11. The method of claim 10, further comprising transmitting the second standardized entity message to a processing device of the TIS for execution of tactical decisions based on the fused target information included in the second standardized entity message.

12. The method of claim 11, wherein the tactical decisions include controlling a subsystem of the TIS to update intelligence information or maneuver the subsystem to perform an action.

13. The method of claim 10, further comprising submitting standardized fusion capability messages that include fusion capability information that describes at least one of technical capabilities for performing fusion of output from the ATR systems and status of the technical capabilities.

14. The method of claim 13, further comprising receiving a standardized query request about capability to fuse target information, wherein the standardized fusion capability messages are submitted in response to the standardized query request and/or periodically.

15. The method of claim 4, further comprising receiving a standardized product processing request that requests target fusion of different target information from one or more subsystems of the TIS, wherein receiving the first standardized entity messages is included with receiving the standardized product processing request, or receiving the first standardized entity messages is in response to a request for the first standardized entity messages.

16. The method of claim 10, wherein the standardized messages are Unmanned Aircraft System (UAS) messages.

17. The method of claim 10, wherein providing the extracted target information to the fusion algorithm further comprises providing the extracted target information to an application program interface (API) of an internal interface.

18. A non-transitory computer readable storage medium having one or more computer programs stored therein, the computer programs comprising instructions, which when executed by a processor of a computer system, cause the processor to:
receive first standardized entity messages that include target information, wherein the target information originates from multiple automatic target recognition (ATR) systems;
parse the first standardized entity messages to extract the target information;
provide the extracted target information as first objects to a fusion algorithm for fusion processing that determines whether to fuse the target information from different ATR systems and fuses the extracted target information to generate fused target information about a single target when determined to do so;
receive whether the target information was fused and the as second objects fused target information about the single target, if any, from the fusion algorithm;
generate a second standardized entity message that includes the fused target information about the single target;
receive from the fusion algorithm a non-standardized success indication that indicates success or failure of fusing the extracted target information by the fusion algorithm; and transmit a standardized product processing report externally that indicates the success or failure of the fusing.

* * * * *